Dec. 18, 1962  S. E. BONWIT  3,068,589
AURAL RADAR SIGNALING CIRCUIT
Filed July 18, 1958
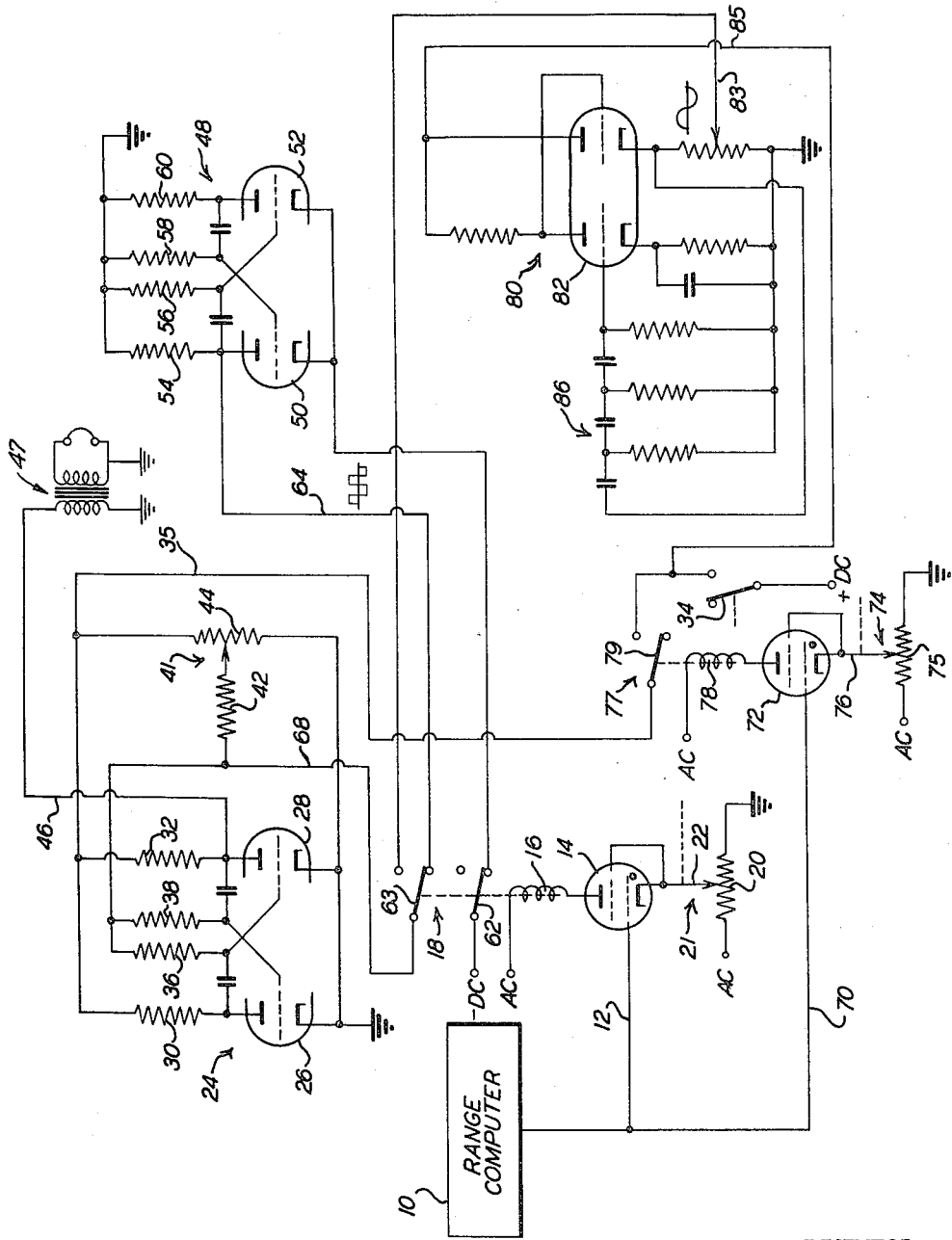
INVENTOR.
STUART E. BONWIT
BY
Donald P. Smith
ATTORNEY 3,068,589
AURAL RADAR SIGNALING CIRCUIT
Stuart E. Bonwit, Silver Spring, Md., assignor to ACF Industries, Incorporated, New York, N.Y., a corporation of New Jersey
Filed July 18, 1958, Ser. No. 749,396
5 Claims. (Cl. 35—10.4)

This invention relates generally to flight training apparatus and more particularly to a system for teaching the art of warfare.

In an actual warplane the pilot depends on his radar system for an automatic signal indication that he is within a predetermined firing range of a target, and that he is within a pull-up range; this being necessary because of the extremely high velocities of modern aircraft and the preoccupation of the pilot with other duties such as avoiding return fire from the hostile craft being attacked. Usually the signal takes the form of an audible tone in the pilot's radio receiver headset, a first distinctive tone being produced to reveal the fact that the attacking plane and the target are within a first predetermined distance, and the second and different tone being depended upon to indicate that the danger of collision with the target is imminent.

As will later be more fully pointed out in the detailed specification the instant invention provides a circuit for use in a flight simulator for connection to the pilot's receiver headset, which circuit generates, in response to a derived voltage from the simulated radar range computer, a first audio frequency which is later automatically replaced with a second audio frequency to indicate to the trainee that the simulated firing run is completed and he must pull out of the firing run path. The several simulated distances between the attacking plane and the target are manually adjustable through the use of controls located in the vicinity of the trainee.

It is accordingly a prime object of this invention to provide a circuit which warns a pilot of an aircraft trainer engaged in a simulated attack on a target when he is within firing range of the target and when he has reached a cease firing (pull-out) range from the target.

It is a more distinct object of this invention to provide in an aircraft simulator a plurality of audio frequency generators which are interconnected to provide a series of tones to thereby warn the trainee of a first predetermined distance between the simulated aircraft and a simulated target and automatically thereafter warn the trainee of a second predetermined distance between the simulated aircraft and the simulated target.

Other objects and many of the attendant advantages of this invention will be readily appreciated as the same becomes better understood by reference to the following description when considered in connection with the accompanying drawings wherein:

The single FIGURE is a schematic diagram of the circuit used in this invention.

Summarily stated, the invention comprises in a flight training apparatus for teaching the art of warfare and having a position simulating apparatus to device voltages representing the varying distances between a simulated aircraft and a simulated target, a circuit having components responsive to the derived voltage to generate an audio frequency to indicate to the trainee that the aircraft and target are within a predetermined firing range, and further circuit components responsive to the derived voltage to generate a second audio frequency to thereby reveal to the trainee that the aircraft and target are within a predetrmind pull-rang.

In the drawing reference character 10 indicates a radar rang computer which may be of any prior art type, reference being made to Patent No. 2,408,081 to Lovel et al. and especially to FIG. 8 thereof for circuitry usable in this type of range computer, such circuitry being depended upon to derive a series of voltages corresponding to the spacing between a simulated vehicle or aircraft and a simulated target. Connected to the radar range computer 10 as by conductor 70 is a thyratron tube 72 having the usual electrodes and responsive to a predetermined voltage appearing on conductor 70 to cut off in the well known way thereby de-energizing coil 78 of relay 77. It will be noted that the cathodes of the thyratrons are connected to a potentiometer having a resistance winding and a movable arm, the winding being connected between a source of alternating current energy and a point of zero voltage, whereby the magnitude of the input voltage from the radar range computer necessary for triggering the tube on and off can be adjusted. As there shown the thyratron is in a conducting state, alternating current energy being used on the plate and cathode thereof so that the grid voltage will control on every cycle in the well understood way. A relay 77 having an energizing coil 78 connected to the plate holds contact 79 in the open position when the tube is conducting. Signals from computer 10 start at a reasonably high value in accordance with the simulated distance between the aircraft and target and decrease in proportion to the diminishing distance. When the predetermined distance (firing range) is reached the grid bias is insufficient to maintain tube conduction and contact 79 is closed by spring action.

A multivibrator circuit having a natural oscillation frequency of about 2000 cycles per second is designated by reference character 24 and has multi-electrode tubes 26 and 28 interconnected in the usual way. Plate load resistors 30 and 32 are connected together and to the contact 79 of relay 77 by conductor 35. A switch 34 manually operable by an instructor is available to apply B+ to the plates of multivibrator 24 when relay 77 closes. Grid biasing resistors 36 and 38 are connected together and to the movable arm of potentiometer 41 having its resistance winding 44 connected between conductor 35 and ground to supply part of the multivibrator grid voltage. The output of the multivibrator is taken from conductor 46 connected to headphones 47 or it may be connected to a speaker or other indicator located in the vicinity of the trainee.

A second thyratron 14 is connected to computer 10 by conductor 12 and has its cathode connected to the movable arm 22 of a potentiometer 21 with resistance winding 20 connected between a source of alternating current energy and ground in a manner similar to the connection of thyratron 72. Relay 18 has energizing coil 16 connected to the tube plate and contacts 62 and 63 are held in the positions there shown when the thyratron is conducting. The thyratron is responsive to the voltage from the computer which, as previously explained, decreases regularly as the simulated aircraft and target approach each other. When a predetermined minimum voltage is reached the tube stops conducting and contacts 62 and 63 are moved to the upper position by spring action.

A second multivibrator indicated by reference character 48 comprises tubes 50 and 52 and has the respective plate and grid resistors 54, 60, 58 and 56 connected together and to ground. The pair of cathodes are connected through contact 62 of relay 18 to a source of negative D.C. voltage, in this case —150 volts. Conductor 64 connects the output of the multivibrator through contact 63 of relay 18 to conductor 68 which interconnects with the grid biasing potentiometer 41. The output of multivibrator 48 is a square wave having a frequency of about 3 cycles per second and is used to decrease and modulate the natural frequency of multivibrator 24. The result is an audio output of about 750 cycles per second corresponding to the constant peak of the positive portion of the square wave interrupted at a rate of 3 cycles per second corresponding to the negative portions of the square wave. The multivibrator frequency is determined by the bias on the grid resistors 36 and 38 which represents the sum of the potentials from potentiometer 41 and the plate voltage on conductor 64. The frequency of 750 cycles per second is not critical but represents merely one of two audio frequencies. This distinctive tone is the firing range tone. The base frequency of multivibrator 24 without the bias from multivibrator 48 is approximately 2000 cycles per second.

A phase shift oscillator 80 having a double triode 82 has a resistance capacitance phase shift circuit 86 for phase shifting feedback which creates a phase shift in proportion to the frequency applied thereto in order to reinforce the action of the grid to make up for circuit losses in the usual manner. The circuit parameters are selected so that the output of oscillator 80 is a sine wave having a frequency of one cycle per second and is taken from the cathode through conductor 83 to contact 63 of relay 18.

The operation of this circuit is as follows: The radar range computer derives voltages in accordance with the changing positions of the aircraft and target during simulated flight, such voltages generally decreasing in proportion to the diminishing distance between the objects. The instructor will close switch 34 when he wishes to observe the trainee's reactions on an attacking run, which action applies B+ to the plates of oscillator 80 and to the now open contact of relay 77. Since both thyratrons 72 and 14 are conducting at the start of the run because of the relatively large voltages from the computer 10 both relays 18 and 77 will be energized and the contacts will be in the positions shown. As the voltage from computer 10 diminishes as the first simulated predetermined distance is reached, thyratron 72 cuts off and contact 79 closes thereby applying B+ to the plates of the tubes of multivibrator 24 and starting its oscillation. However, the square wave output of multivibrator 48 also appears on conductor 68 through contact 63 of relay 18, which is still energized, and the trainee hears an audio frequency of 750 cycles per second interrupted at a frequency of 3 cycles per second which indicates to him that he is within firing range. As the simulated distance between the aircraft and target further decreases the voltage output of computer 10 is reduced until thyratron 14 cuts off. Spring action automatically shifts contacts 62 and 63 to their upper positions which removes the source of voltage from the cathodes of multivibrator 48 and connects the output of oscillator 80 into the grid circuit of multivibrator 24. The trainee now hears the natural frequency of the multivibrator which is about 2000 cycles per second frequency modulated at a rate of one cycle per second which yields a siren tone varying from 1800 to 2200 cycles per second corresponding to the varying amplitude of the one cycle per second sine wave. This indicates that the pullout or cease fire distance has been reached and the trainee's response to such warning can be observed.

As previously mentioned wiper arms 22 and 76 on the thyratron cathode potentiometers are adjustable manually to preset the simulated distances at which the warnings will occur. The effect of moving the arms is to provide a variation in the thyratron cathode voltages whereby the grids will turn off the tubes at different voltages derived by the computer.

It will therefore be seen that we have provided a novel simulator circuit for producing to a trainee a plurality of warning signals whereby he is first warned that he is within a predetermined distance of the target in simulated flight and thereafter is further warned that the time for cease fire and pull-out has arrived; thus a pilot's reaction to these realistic warnings may be observed by an instructor in the safety of the simulated cockpit without endangering lives or machines.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a craft training apparatus the combination comprising a position simulating apparatus, means to derive voltages representing the varying distances between a simulated craft and a simulated target, indicating means, an audio frequency generator of the multivibrator type including means for changing the frequency, said frequency activating said indicating means, a first circuit connected between the position simulating apparatus and said generator and responsive to a predetermined magnitude of derived voltage to initiate operation of the generator to indicate aurally to the trainee that the simulated craft and simulated target are within a predetermined firing range, a phase shift oscillator circuit for changing the frequency of the audio frequency oscillator and a second circuit connected between the position simulating apparatus the audio frequency generator and the phase shift oscillator and responsive to a second predetermined magnitude of derived voltage to change the frequency of the audio frequency generator to indicate that the simulated aircraft and simulated target are within a predetermined pull-up range in simulated travel.

2. The invention as set forth in claim 1 including means in the first and second recited circuits and under the control of a trainee to vary the point of response of said first and second circuits to the recited voltage deriving means to simulate changing the predetermined firing range and the predetermined pull-up range.

3. In flight training apparatus for teaching the art of warfare and having a position simulating apparatus to derive a voltage representing the distance between a simulated aircraft and a simulated target the combination comprising a multivibrator circuit having a first audio oscillating frequency and having the output thereof connected to an audio frequency responsive transducer in the vicinity of a trainee, a second multivibrator circuit having a low frequency square wave output, an oscillator circuit having a low frequency sine wave output, a first circuit connected to the position simulating apparatus and including means responsive to a first magnitude of the derived voltage to connect the output of the said second multivibrator to the first recited multivibrator circuit to produce an audio output lower than the first audio frequency and periodically interrupted to indicate to the trainee that the simulated aircraft is within a predetermined distance of the simulated target, and a second circuit connected to the position simulating apparatus and including means responsive to a second magnitude of the derived voltage to connect the output of the said oscillator circuit to the first recited multivibrator circuit to frequency modulate the first audio oscillating frequency to produce an audio frequency periodically rising above and falling below the first audio oscillating frequency to indicate to a trainee that the simulated aircraft and target are within a second predetermined distance.

4. The invention as set forth in claim 3 including means in the said first and second circuits and under the control of the trainee to vary the response thereof to simulate changing the predetermined distances between the simulated aircraft and target.

5. In a craft training apparatus the combination comprising a position simulating apparatus, means to derive voltages representing the varying distances between a simulated craft and a simulated target the combination comprising a variable audio frequency generator, a first circuit connected between the position simulating apparatus and the said generator and responsive to a predetermined magnitude of derived voltage to initiate operation of the generator so that said generator provides an audio indication to the trainee that the craft and target are within a predetermined firing range during simulated flight, a second generator, a second circuit connected between the position simulating apparatus and the second generator and responsive to a second predetermined voltage magnitude to initiate operation of the second generator to thereby vary the frequency output of the first generator so that said first generator provides an audio indication to the trainee that the craft and target are within a predetermined pull-up range in simulated travel and means in said first and second recited circuits and under the control of the trainee to vary the point of response of said first and second circuits to said voltage deriving means to simulate changing the predetermined firing range and the predetermined pull-up range respectively.

References Cited in the file of this patent

UNITED STATES PATENTS

| | | |
|---|---|---|
| 2,395,368 | Bull | Feb. 19, 1946 |
| 2,403,527 | Hershberger | July 9, 1946 |
| 2,445,712 | Forbes | July 20, 1948 |
| 2,514,602 | Grandmont | July 11, 1950 |
| 2,529,468 | Dehmel | Nov. 7, 1950 |
| 2,533,821 | Langer | Dec. 12, 1950 |
| 2,571,368 | Kahn et al. | Oct. 16, 1951 |
| 2,688,131 | Kiebert | Aug. 31, 1954 |